United States Patent
Hirai et al.

(10) Patent No.: US 8,302,309 B2
(45) Date of Patent: Nov. 6, 2012

(54) PROCESS FOR PRODUCING BEARING DEVICE FOR WHEEL

(75) Inventors: Isao Hirai, Iwata (JP); Kohei Yoshino, Iwata (JP); Takayasu Takubo, Iwata (JP); Kazuhiko Yoshida, Iwata (JP); Kazukuni Hase, Tokyo (JP); Hideto Kimura, Tokyo (JP); Kiyoshi Uwai, Tokyo (JP); Takaaki Toyooka, Tokyo (JP)

(73) Assignees: NTN Corporation, Osaka (JP); JFE Steel Corporation, Tokyo (JP)

( * ) Notice: Subject to any disclaimer, the term of this patent is extended or adjusted under 35 U.S.C. 154(b) by 1325 days.

(21) Appl. No.: 11/989,106

(22) PCT Filed: Jul. 10, 2006

(86) PCT No.: PCT/JP2006/313662
§ 371 (c)(1),
(2), (4) Date: Jan. 22, 2008

(87) PCT Pub. No.: WO2007/010774
PCT Pub. Date: Jan. 25, 2007

(65) Prior Publication Data
US 2009/0106980 A1    Apr. 30, 2009

(30) Foreign Application Priority Data
Jul. 20, 2005    (JP) ................................ 2005-210616

(51) Int. Cl.
*B23P 17/00*    (2006.01)
(52) U.S. Cl. ............... 29/894.321; 29/894.3; 29/894.32; 29/898.09; 188/18 A; 188/218 XL; 301/6.8; 301/105.1; 301/110; 384/544; 384/589; 384/625

(58) Field of Classification Search ............... 29/898.09, 29/894.3, 894.32, 894.321; 188/18 A, 218 XL; 301/6.8, 105.1, 110; 384/544, 589, 625; 464/178
See application file for complete search history.

(56) References Cited

U.S. PATENT DOCUMENTS

| 5,759,309 | A | 6/1998 | Watts et al. | |
|---|---|---|---|---|
| 2004/0252927 | A1* | 12/2004 | Hirai et al. | 384/544 |
| 2006/0033381 | A1 | 2/2006 | Suma | |

(Continued)

FOREIGN PATENT DOCUMENTS

JP    2004-182127    7/2004

(Continued)

OTHER PUBLICATIONS

European Search Report issued Dec. 6, 2010 in corresponding European Patent Application 06768024.9.

(Continued)

*Primary Examiner* — Richard Chang (57) ABSTRACT

A method is directed to a production of a bearing device for a wheel including an inner member and an outer member rotatable relative to each other through a plurality of rolling elements, in which a component part forming one of the inner member and the outer member is a hot forged product. In the practice of this method, during or at the end of a hot forging step for hot forging the component part, a portion of the component part is cooled by spraying a coolant or by controlling an atmospheric temperature, to thereby render a matrix of the component part to represent a standard structure and render a surface portion of the component part to represent a non-standard structure.

3 Claims, 9 Drawing Sheets

U.S. PATENT DOCUMENTS

2008/0264530 A1  10/2008  Hase et al.

FOREIGN PATENT DOCUMENTS

| | | |
|---|---|---|
| JP | 2005-3061 | 1/2005 |
| JP | 2005-145313 | 6/2005 |
| JP | 2005-232581 A | 9/2005 |
| JP | 2006-36112 | 2/2006 |
| JP | 2006-52816 | 2/2006 |
| JP | 2006-137297 | 6/2006 |
| JP | 2007-039704 A | 2/2007 |
| WO | 99/02744 | 1/1999 |
| WO | 00/65105 | 11/2000 |

OTHER PUBLICATIONS

International Search Report (PCT/ISA/210) of International Application PCT/JP2006/313662 (mailed on Oct. 3, 2006).

International Preliminary Report on Patentability, mailed Jan. 31, 2008 and issued in corresponding International Patent Application No. PCT/JP2006/313662.

Japanese Notification of Reason(s) for Rejection issued Sep. 13, 2011 in corresponding Japanese Patent Application 2005-210616.

Japanese Communication of Offer of Information issued on Mar. 31, 2009 in corresponding Japanese Patent Application 2005-210616.

Japanese Notification of Reason(s) for Rejection issued Apr. 10, 2012 in corresponding Japanese Patent Application 2005-210616.

* cited by examiner

PROCESS FOR PRODUCING BEARING DEVICE FOR WHEEL

CROSS REFERENCE TO RELATED APPLICATIONS

This application claims the benefit under 35 U.S.C. Section 371, of PCT International Application Number PCT/JP2006/313662, filed Jul. 10, 2006 and Japanese Application No. 2005-210616, filed Jul. 20, 2005 in Japan, the contents of which are incorporated herein by reference.

FIELD OF THE INVENTION

The present invention relates to a process for producing a bearing device for a wheel in an automotive vehicle such as, for example, a passenger car or a cargo transport vehicle, which is designed to increase the strength or the like.

BACKGROUND OF THE INVENTION

In a wheel support bearing device of a kind to which the present invention pertains, it is well known that the wheel hub has a wheel mounting flange formed integrally therewith so as to extend radially outwardly therefrom so that a vehicle wheel can be removably secured thereto by means of a plurality of bolts. This wheel mounting flange has a root portion integral with the wheel hub, which generally tends to be subjected to considerable stresses particularly when an automotive vehicle makes an abrupt turn. Accordingly, in order to increase the fatigue strength for the purpose of avoiding fracture of the root portion of the wheel mounting flange relative to the wheel hub, such root portion is generally treated with an induction heat treatment or an induction hardening such as disclosed in, for example, the Japanese Laid-open Patent Publication No. 2004-182127 or a shot peening such as disclosed in, for example, the Japanese Laid-open Patent Publication No. 2005-145313. Also, in order to increase the fatigue strength, a method has been suggested, in which a component part is in its entirety thermally refined such as disclosed in, for example, the Japanese Laid-open Patent Publication No. 2005-003061.

Figure 14:
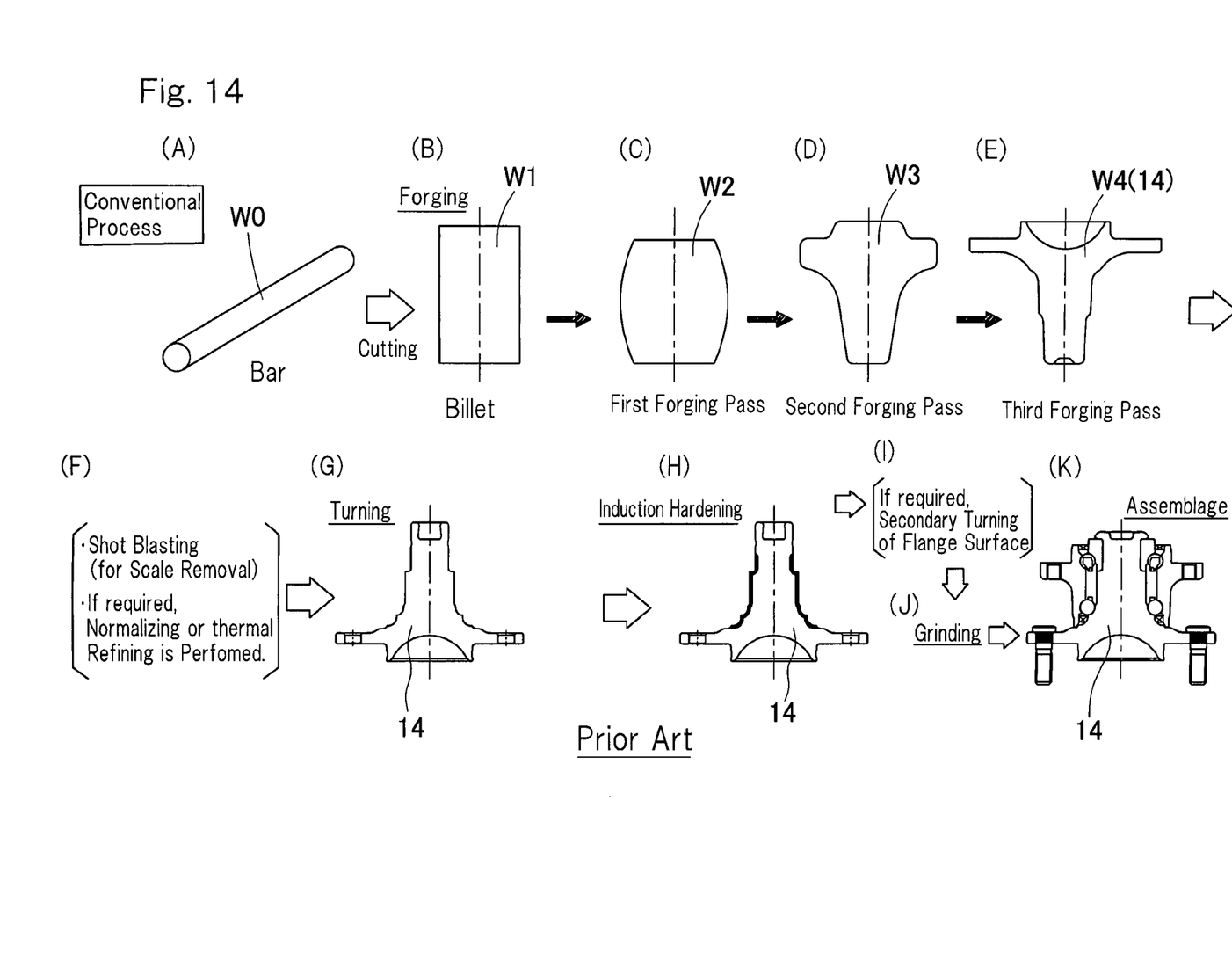
FIG. 14 is an explanatory diagram showing the sequence of a forgoing step and the subsequent step used in the manufacture of a hub axle employed in the conventional wheel support bearing device.

FIG. 14 illustrates a generally employed method of making a wheel hub used in a conventional wheel support bearing assembly of a third generation type. This generally employed method includes cutting a bar W0 to a predetermined size as shown by (A) in FIG. 14 to thereby provide a billet W1, as shown by (B) in FIG. 14, which eventually serves a raw material for one wheel hub. The billet W1 is then passed through a plurality of passes forming respective steps of a hot forging process, which passes include, for example, a first forging pass, a second forging pass and a third forging pass, to allow it to eventually assume a shape similar to the shape of the wheel hub, followed by a final forging process by which a finally forged product W4 of a shape approximately similar to the shape of the wheel hub can be obtained. See (C) to (E) in FIG. 14.

The finally forged product W4 is treated with a shot blasting for the purpose of removal of surface scales and is subsequently normalized or thermally refined if so required, as shown by (F) in FIG. 14. Then, the finally forged product W4 is subjected to turning as shown by (G) in FIG. 14, followed by induction heat treatment, as shown by (H) in FIG. 14, applied to raceway surfaces or the like. Also, if required, a secondary turning is carried out subject to flange surfaces or the like as shown by (I) in FIG. 14. Thereafter, grinding is effected to finish the wheel hub 14, which is subsequently assembled to complete a wheel support bearing device.

It may often be experienced that the induction heat treatment hitherto employed to increase the fatigue strength cannot be employed satisfactorily depending on the shape of a component part where the induction hardening is applied. For example, such cases are observed that in view of the fact that the root portion of the wheel mounting flange referred to above has its side surface, from which a pilot portion for guiding a brake and/or a vehicle wheel protrudes, the radius of curvature of a corner between the flange and the pilot portion tends to be small and/or the pilot portion represents a plurality of prongs that are dispersed in a direction circumferentially thereof through corresponding cutouts. In the case of such shape, a problem may occur that a portion of a component part, when locally heated to an elevated temperature as a result of the induction hardening, may melt down and, accordingly, no induction hardening cannot be employed.

Also, in the practice of the induction hardening and the shot peening, it may occur that the number of process steps tends to increase and/or the run-out precision of the flange may be lowered.

In the case of a method, in which the component part in its entirety is thermally refined to increase the hardness, the number of process steps increases. Also, an increase of the hardness results in reduction of the processability (for example, the capability of being machined, and the cold workability such as, for example, a crimping process) of the entirety, and, accordingly, reduction of a slip torque that may be brought about as a result of insufficient press-fitting of hub bolts to respective bolt holes of the flange, for example, may occur.

With the conventional method shown and described with reference to FIG. 14, while the normalizing or thermal refining is carried out in order to increase the fatigue strength of the wheel hub 14 in its entirety, the production is complicated and time-consuming because of the increase in number of process steps including normalization or thermal refinement, and, further, the amount of energies consumed increases because of the necessity that the wheel hub 14 after forged and then cooled must be heated again. Although there is a case, in which the normalization or the thermal refinement referred to above may be dispensed with, the wheel hub may have a structure containing relatively large crystalline particles, have a reduced strength and a reduced toughness and have a low fatigue strength if the normalization or thermal refinement is dispensed with.

Also, in recent years, in order to increase the mileage and reduce the environmental loading, compactization and reduction in weight are strongly desired for even in the wheel support bearing device and, accordingly, it is necessary to achieve such compactization and reduction in weight while securing a high fatigue strength and a life time.

SUMMARY OF THE INVENTION

An object of the present invention is to provide a method of producing a bearing device for wheel, in which the strength and the fatigue strength can be increased by a grain refinement of the structure and an increase of the hardness, and further, an undesirable reduction in productivity resulting from an increase of the number of process steps can be suppressed.

A method of the present invention is directed to a production of a bearing device for a wheel including an inner member and an outer member rotatable relative to each other through a plurality of rolling elements, in which a component part forming one of the inner member and the outer member is a hot forged product. In the practice of this method for producing the wheel support bearing device, during or at the end of a hot forging step for hot forging the component part, a portion of the component part is cooled by spraying a coolant or by controlling an atmospheric temperature, to thereby render a matrix of the component part to represent a standard structure and render a surface portion of the component part to represent a non-standard structure.

According to this method, during or at the end of the hot forging step, a portion of the component part is cooled by spraying the coolant or by controlling the atmospheric temperature, to thereby render the matrix of the component part to represent the standard structure and render the surface portion of the component part to represent the non-standard structure. Accordingly, with this method of the present invention, the strength and the fatigue strength of a portion representing the non-standard structure can be increased as a result of grain refinement of the structure and increase of the hardness. Also, since that portion representing the non-standard structure can be obtained by cooling during the step of hot forging or at the end of such hot forging step, a simple process may be pursued and an undesirable reduction in productivity resulting from increase of the number of process steps can be suppressed.

Specifically, according to the present invention, an advantage can be appreciated that the conventional normalizing, thermal refining or the induction hardening intended to increase the fatigue strength is dispensed with and, yet, the fatigue strength equal to or higher than that obtained by the normalizing, thermal refining or induction hardening can be obtained. Unlike the induction hardening, the non-standard structure can be obtained even with a minute component part such as, for example, a fillet and/or projections of the component part without being accompanied by troubles such as, for example, melt-down of a minute component part. Also, since the heat evolved in the hot forging is utilized, the amount of energies necessary to perform the reformation of the structure can be reduced advantageously.

The non-standard structure referred to above may be any one of, for example, a fine ferrite-pearlite structure, an upper bainite structure, a lower bainite structure and a tempered martensite structure, or a mixed structure comprised of at least two or more of those structures. In practice, however, which one of those structures is to be chosen depends on the site, at which the non-standard structure is desired to be formed, and the required functionality.

Which one of those non-standard structures is to be chosen may be modified depending on the method of cooling that is performed during or at the end of the hot forging step discussed above.

Where the fine ferrite-pearlite structure is to be chosen as the non-standard structure, at the end of the hot forging step a coolant is showed over the component part to cool it locally, followed by self-heat-recuperation.

Where the fine ferrite-pearlite structure is to be chosen as the non-standard structure by means of a different method, and in the event that the hot forging step includes a plurality of forging substeps, the component part has to be locally cooled before the forging at the final forging substep, followed by the forging at the final forging substep. Addition of a forging substep after the cooling is effective to impart dynamic strains and, therefore, the fine ferrite-pearlite structure can be obtained.

On the other hand, where the tempered martensite structure is to be chosen as the non-standard structure, at the end of the hot forgoing step the component part is cooled down to a martensite start point or lower, followed by heat-recuperation tempering. The tempered martensite structure is a thermally refined structure and, depending on the temperature at which the heat-recuperation tempering is carried out after the cooling, sorbite or troostite can be obtained.

Where the upper bainite structure is to be chosen as the non-standard structure, the component part has to be cooled down to a temperature about equal to the room temperature at a predetermined cooling speed at the end of the hot forging step.

Where the lower bainite structure is to be chosen as the non-standard structure, the component part has to be cooled down to a temperature about equal to the room temperature at a predetermined speed at the end of the hot forging step. The lower bainite structure can be obtained when the cooling speed is chosen to be lower than that used to obtain the upper bainite structure.

In the practice of the method of the present invention, the component part, where the non-standard structure is to be formed, is a component part having a wheel mounting flange and a portion where the non-standard structure is to be formed is a surface of a root portion of the wheel mounting flange.

Since the wheel mounting flange is a portion where repeated stresses act considerably during an abrupt cornering of an automotive vehicle, a sufficient strength and a sufficient fatigue strength are required. Accordingly, an effect of increasing the strength and the fatigue strength brought about by the method of the present invention can be appreciated.

Although the method of the present invention can be applied to any type of wheel support bearing devices, it can be equally applied to a wheel support bearing device of a type, in which the inner member is comprised of a hub and an inner ring mounted on an outer periphery of an axle portion of the hub while a component part where the non-standard structure referred to above is to be formed is the hub. The hub in this case may be a hub of a component part separate from and independent of a completed product of a bearing assembly which may be, for example, a double row rolling bearing assembly.

In the practice of the method of the present invention, the hardness of each of a portion of the non-standard structure and a portion of the standard structure may be suitably selected, but the hardness of the non-standard structure and the hardness of the matrix portion may be selected to be within the range of 20 to 40 HRC and within the range of 13 to 25 HRC, respectively.

The lowermost limit of the hardness of that portion of the non-standard structure is preferably 20 HRC, which is a value equal to about the intermediate value of the hardness of the matrix, or higher and, more preferably 25 HRC or higher, in order to increase the fatigue strength resulting from increase of the hardness. The uppermost limit of the hardness of the non-standard structure is preferably 40 HRC or lower in order to secure the capability of being machined.

The material used is a carbon steel (of a kind containing carbon in a quantity of 0.4 to 0.8%), but in the case of S53C, the hardness of the standard structure portion will fall within the range of 13 to 25 HRC. Considering the use of a cold working such as, for example, a crimping and portions where hub bolts are press-fitted, it is preferred to be 25 HRC at maximum.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENT

Figure 1:
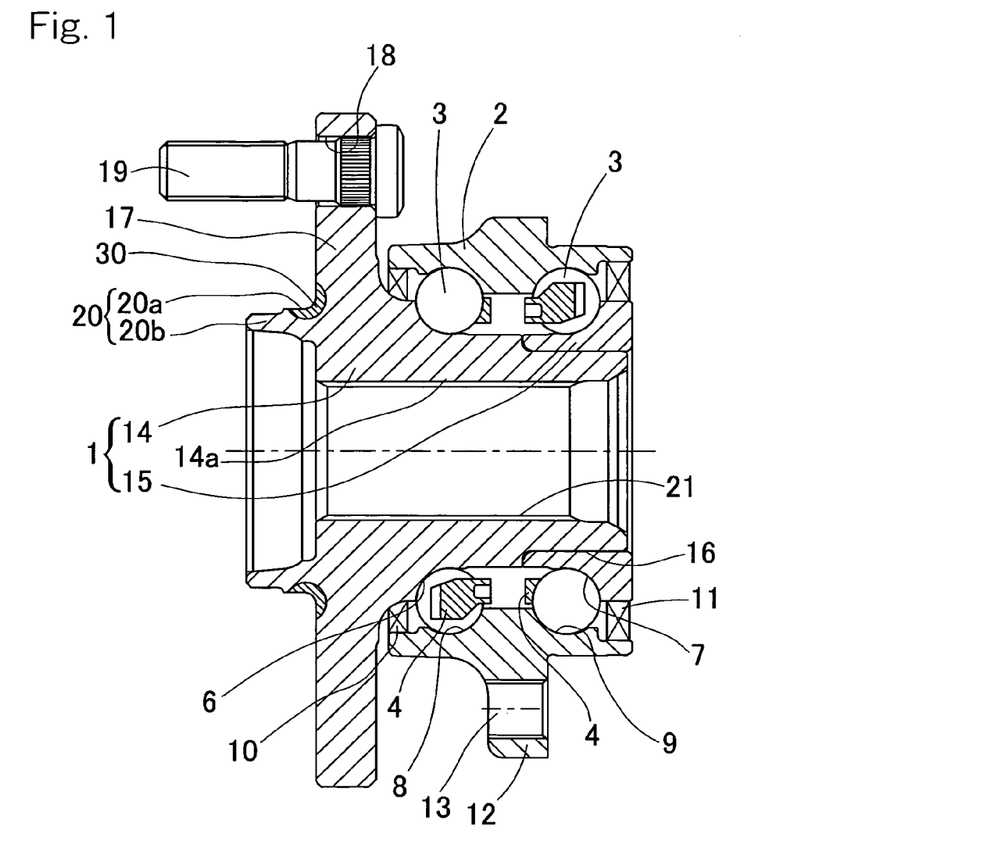
FIG. 1 is a longitudinal sectional view showing one example of a wheel support bearing device manufactured by a producing method according to first preferred embodiment of the present invention.

The first preferred embodiment of the present invention will be described with particular reference to FIGS. 1 to 5. FIG. 1 illustrates an example of a wheel support bearing device and this example is applied to that for the support of a vehicle drive wheel of a third generation type. This wheel support bearing device includes an inner member 1 and an outer member 2, which are rotatable relative to each other through multiple rows of rolling elements 3, and the rolling elements 3 of each row are retained by a retainer 4. The multiple rows referred to above may mean two or more rows, but in the instance shown therein, the double rows are employed. Each of the inner and outer members 1 and 2 has respective raceway surfaces 6, 7 and respective raceway surfaces 8, 9 defined therein. This wheel support bearing device is rendered to be a double row angular contact ball bearing type, in which the rolling elements 3 of each row are in the form of balls and the raceway surfaces 6 and 7 are so formed as to permit the contact angle to be oriented outwards. Opposite annular ends of a bearing space delimited between the inner member 1 and the outer member 2 are sealed by respective sealing members 10 and 11.

The outer member 2 is a member of one-piece construction and is provided with a vehicle body fitting flange 12 at an arbitrarily chosen axial location. An outer peripheral surface portion of the outer member 2 on an inboard (rightward) side of the vehicle body fitting flange 12 defines a surface on which a knuckle (not shown) forming apart of a vehicle suspension system is mounted. It is to be noted that in the specification as herein set forth, one side of the vehicle body away from the longitudinal center thereof in a condition, in which the vehicle wheel is mounted is referred to as "outboard" whereas the other side of the vehicle body close to the longitudinal center thereof in the same condition is referred to as "inboard". The vehicle body fitting flange 12 has a plurality of vehicle body fitting holes 13 at respective locations circumferentially thereof, which holes 13 may be either a bolt insertion hole or an internally threaded hole.

The inner member 1 is of a two-piece construction including a hub 14 and an inner ring 15 mounted on an outer periphery of an inboard end of an axle portion 14a of the hub 14. The hub 14 and the inner ring 15 are formed with the raceway surfaces 6 and 7, respectively. An inboard end of an outer periphery of the axle portion 14a of the hub 14 is provided with an inner ring mounting surface 16 that is radially inwardly stepped to have a small diameter. The inner ring 15 is mounted on this inner ring mounting surface 16. The hub 14 has a center portion provided with a throughhole 21, through which a stem portion (not shown) of a constant velocity universal joint is inserted.

The hub 14 has a wheel mounting flange 17 formed on an outer periphery of an outboard end of the axle portion 14a, and bolt press-fitting holes 18 are defined in the wheel mounting flange 17 at a plurality of locations circumferentially thereof. Hub bolts 19 are fitted in a press-fitted fashion to the respective bolt press-fitting holes 18.

A generally or substantially annular pilot portion 20 coaxial with the hub 14 protrudes axially outwardly from a root portion of the wheel mounting flange 17 in the hub 14. This pilot portion 20 includes a brake pilot 20a for guiding a brake disc, which is fitted to an outboard side face of the wheel mounting flange 17 in overlapped relation therewith, and a wheel pilot 20b protruding in an outward direction beyond the brake pilot 20a. It is to be noted that pilot portion 20 may be in the form in which a plurality of cutouts are provided at a corresponding number of locations circumferentially thereof so as to be divided.

Figure 6:
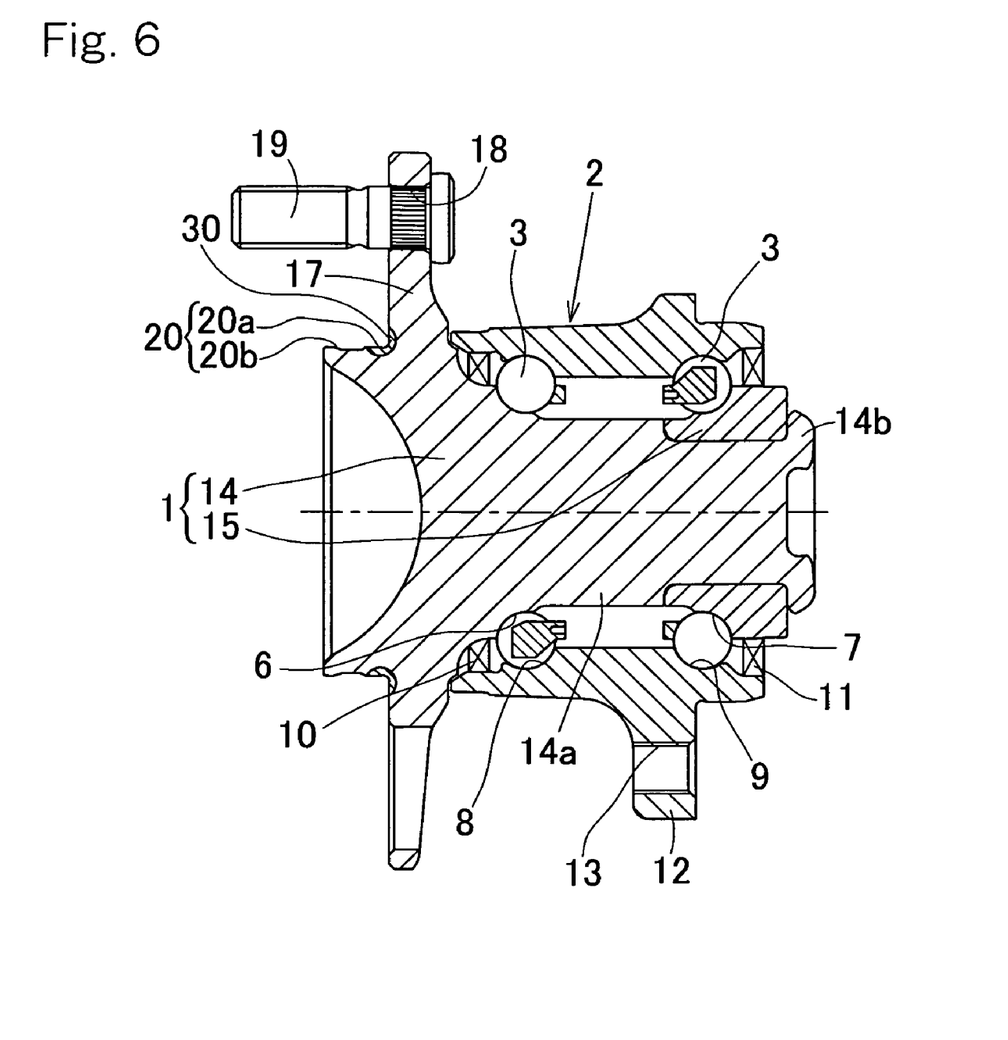
FIG. 6 is a longitudinal sectional view showing an example of the wheel support bearing device manufactured by the producing method according to second preferred embodiment of the present invention.

It is also to be noted in the wheel support bearing device for the support of a vehicle driven wheel, the hub 14 is not provided with such a throughhole 21 as employed in the example of FIG. 1, as shown in FIG. 6.

Figure 2:
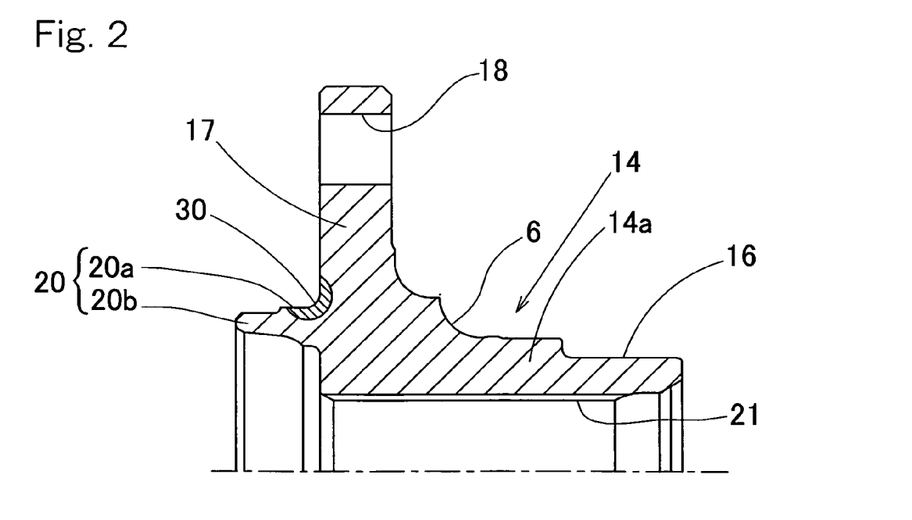
FIG. 2 is a fragmentary longitudinal sectional view showing a hub employed in the wheel support bearing device.

Referring to FIGS. 1, 2 and 6, the hub 14 and the inner ring 15, both forming respective component parts of the inner member 1, and the outer member 2 are all prepared from a hot forged product of steel material and, of them, a surface area of the hub 14 at the root portion of the wheel mounting flange 17 is rendered to be a non-standard structural part 30. A matrix part of the hub 14 is a standard structure. The non-standard structure of the non-standard structural part 30 is a structure that is obtained by showering a coolant over the hub 14 to locally cool the latter during a hot forging step or at the end of the hot forging step, and may be any one of, for example, a fine ferrite-pearlite structure, an upper bainite structure, a lower bainite structure and a tempered martensite structure, or a mixed structure comprised of at least two or more of those structures.

Figure 3:
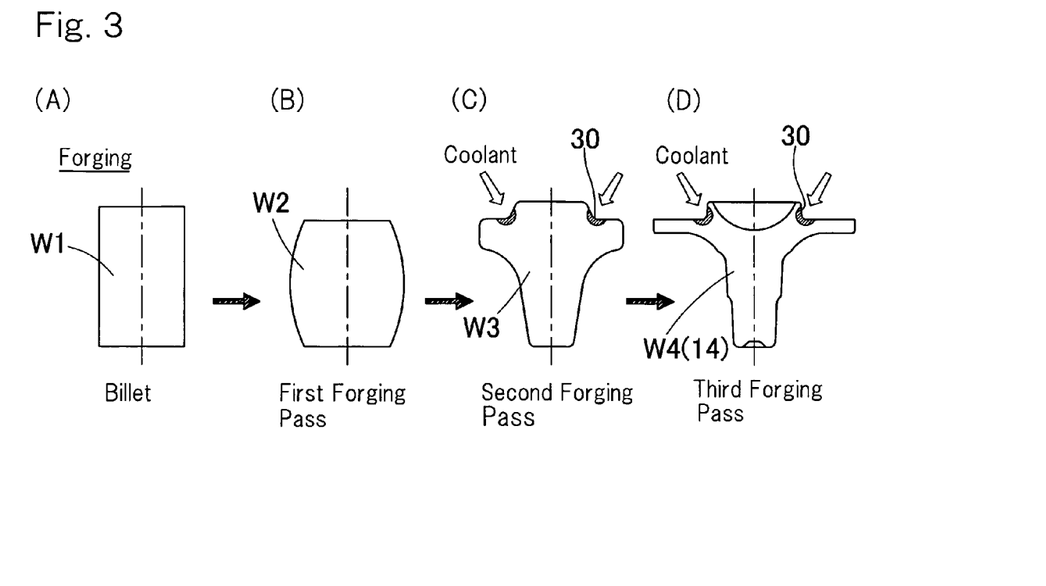
FIG. 3 is a flowchart showing the sequence of forging of the hub employed in the wheel support bearing assembly.
Figure 4:
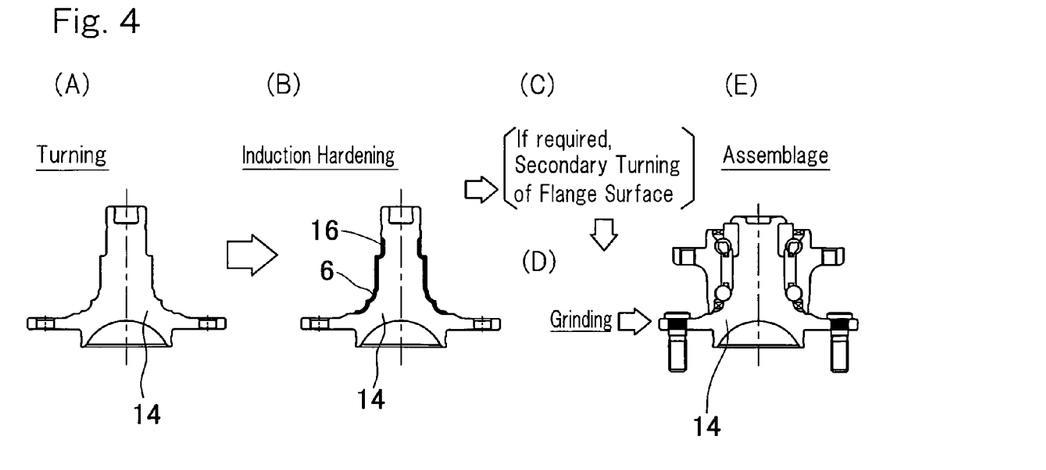
FIG. 4 is a flowchart showing the sequence of processing of the hub employed in the wheel support bearing assembly subsequent to the forging.

FIG. 3 illustrates a hot forging step of the process of making the hub 14 and FIG. 4 illustrates a process step subsequent to the hot forging of the hub 14. It is to be noted that although FIGS. 3 and 4 exemplify the manufacture of the wheel support bearing device for the support of the vehicle driven wheel as shown in FIG. 6, the process shown in and described with reference to FIGS. 3 and 4 can be equally applied to that of the wheel support bearing device for the support of the vehicle drive wheel as shown in FIG. 1.

As shown by (A) in FIG. 3, a bar (not shown) is cut to a predetermined length to provide a billet W1, which eventually serves as a raw material for one hub axle 14. This billet W1 is then passed through a plurality of steps of the hot forging process, for example, a first forging pass, a second forging pass and a third forging pass, to allow it to gradually approach to the shape of the hub 14 and, at the final forging step (the third forging pass), a finally forged product W4 of a shape approximately similar to the shape of the hub axle 14 can be obtained ((B) to (D) in FIG. 14).

The finally forged product W4 is subject to turning as shown by (A) in FIG. 4 and the raceway surface 6 and the inner ring mounting surface 16 are treated with an induction heating (as shown by (B) in FIG. 4). Thereafter, the raceway surface 6 and others are ground (as shown by (D) in FIG. 4). If required, a secondary turning of surfaces of the wheel mounting flange 17 and other is carried out prior to the grinding (as shown by (C) in FIG. 4). The hub 14, of which raceway surfaces have been completely ground, is subsequently incorporated in a wheel support bearing device (as shown by (E) in FIG. 4) to complete the latter.

The non-standard structural part 30 of the hub axle 14 is thermally refined when a coolant is locally sprayed to a thermal refining subject area at the end of the forging step as shown by (D) in FIG. 3 or when a coolant is locally sprayed to a thermal refining subject area subsequent to the termination of the forging step (the second forging pass) preceding the final forging step (the third forging pass) as shown by (C) in FIG. 3.

The coolant referred to hereinabove and hereinafter may be employed in the form of liquid, a mist of liquid or gas and, particularly for example, water, oil or a low temperature air or the like. Also, depending on the use, the coolant may be mixed with, for example, a lubricant, a media and/or an anti-rusting agent to facilitate lubrication and mold releasing of the raw material, cooling and prevention of wear of a mold assembly, elimination of removal of scales by means of a shot blasting to be effected subsequent to the forging, and/or an anti-rusting effect.

The cooling may be carried out to the raw material W3 or W4, which eventually forms the hub 14, while the latter is rotated about its own longitudinal axis so as to perform a peripherally uniform cooling of the raw material W3 or W4. Alternatively, without the raw material W3 or W4 being rotated, a coolant spraying device (not shown) may be turned around the raw material W3 or W4.

For the spraying of the coolant, a cooling jacket (not shown) of a ring shape having a spraying holes defined therein may be employed. Where the raw material W3 or W4 which eventually forms the hub 14 is rotated, any type capable of spraying through a nozzle at a single location may be employed.

Where the raw material W3 or W4, which eventually forms the hub 14, is rotated during the cooling, it may be either one of the longitudinal axis or the transverse axis. Also, the direction in which the coolant is sprayed may be either upwards or downwards and may be oriented in any direction in addition to the transverse orientation when the rotation takes place about the transverse axis. It is to be noted that where the hub 14 has no center throughhole such as in the example shown in FIG. 6, the spraying has to be made in an upward direction so that the coolant will not be pooled therein.

As for the method of retaining the raw material W3 or W4 during the cooling process, which eventually forms the hub 14, any method may be used provided that a portion to be cooled can be uniformly cooled. Therefore, any of the axle portion 14a, an outer diametric portion of the wheel mounting flange 17, and an outer diametric portion of the pilot portion 20 may be retained. Where the hub axle 14 has the throughhole 21 defined in a center portion such as observed in that used for the support of the vehicle drive wheel, a centering retention may be effected with this throughhole 21 utilized as a guide.

Which one of the fine ferrite-pearlite structure, the upper bainite structure, the lower bainite structure, the tempered martensite structure and the mixed structure comprised of at least two or more of those structures is to be formed as the structure of the non-standard structural part 30 as a result of the cooling can be determined by suitably choosing a cooling method which will now be described with particular reference to FIG. 5.

Figure 5:
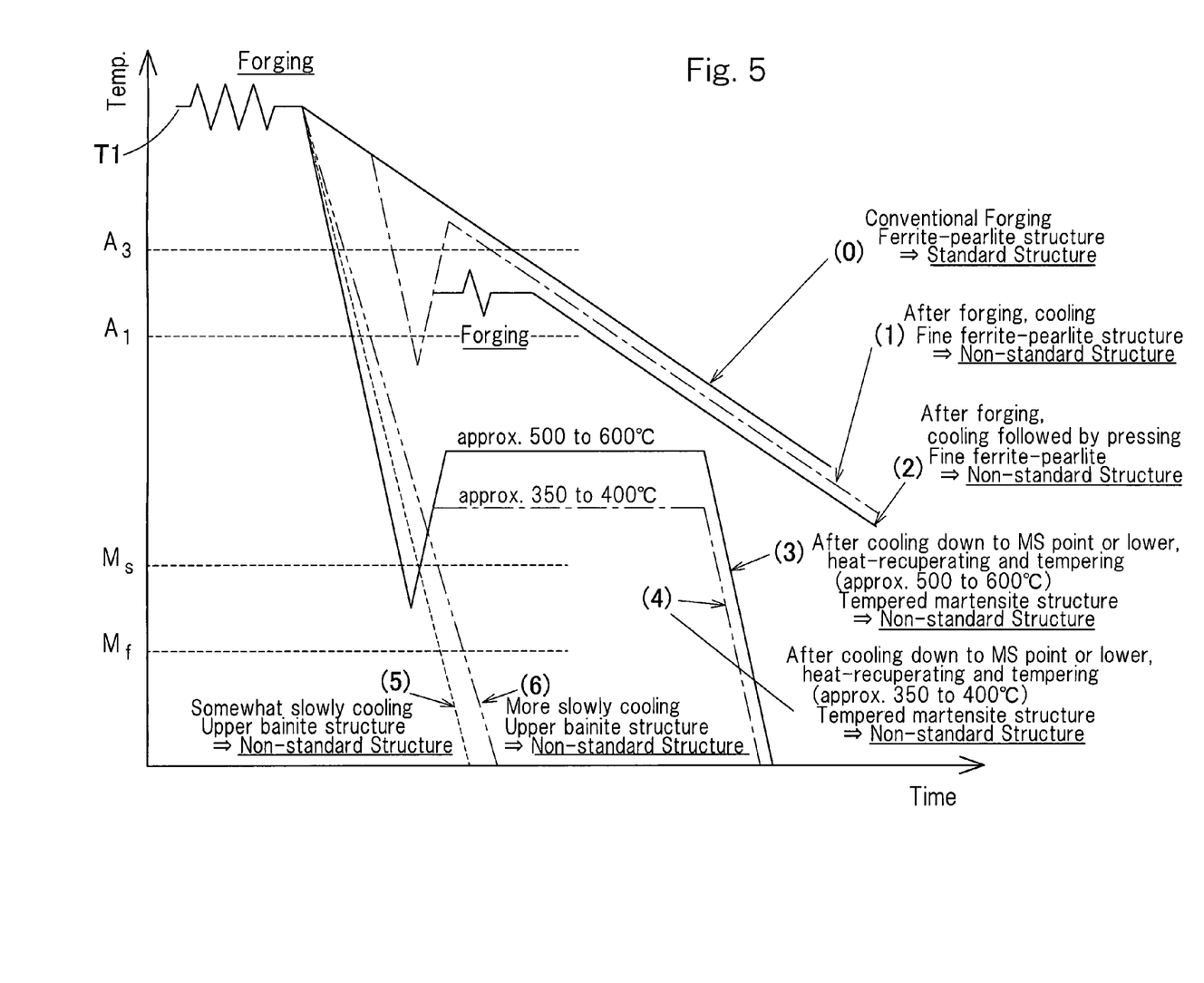
FIG. 5 is an explanatory chart showing cooling curves necessary to obtain various non-standard structures in a hot forged component part.

In FIG. 5, the axis of abscissas represents the time passed and the axis of ordinates represents the temperature. Symbols $A_1$ and $A_3$ shown in FIG. 5 represents the $A_1$ transformation point and the $A_3$ transformation point, respectively. Symbols $M_s$ and $M_f$ shown in FIG. 5 represent a martensite start point (hereinafter referred to as Ms point) and a martensite finish point (hereinafter referred to as Mf point), respectively.

Steel material forming the raw material is a carbon steel containing carbon in a quantity within the range of 0.4 to 0.8% such as, for example, S53C or the like.

Referring to FIG. 5, as shown by a curve (0), if a component part is merely air cooled from a forging temperature T1 (which is higher than the $A_3$ transformation point), the standard structure, which is a structure formed by the conventional forging, that is, a ferrite-pearlite structure will develop.

A curve (1) represents a cooling curve applicable where as a non-standard structure, a fine ferrite-pearlite structure is to be obtained. When at the end of the hot forgoing step, that is, during a period in which cooling is effected after the hot forging, a component part to be thermally refined (raw material) by means of showering a coolant is locally cooled as shown by (D) in FIG. 3 and is subsequently allowed to be self-heat-recuperated after the cooling with the cooling time limited, the fine ferrite-pearlite structure can be obtained as the non-standard structure. The fine ferrite-pearlite structure is a structure that can be obtained by normalizing, that is, a normalized structure.

A curve (2) shown in FIG. 5 is a different cooling curve applicable where as a non-standard structure, a fine ferrite-pearlite structure is to be obtained. In this case, if the hot forging step includes a plurality of forging substeps as shown in and described with reference to FIG. 3, the component part (raw material W3) is partly cooled (as shown by (C) in FIG. 3) prior to the forging step at the final stage (shown by (D) in FIG. 3) and, thereafter, the forging substep at the final stage (shown by (D) in FIG. 3) is carried out. The final forging substep is carried out, for example, during the self-heat-recuperation taking place subsequent to the cooling discussed above. In this way, addition of a forging substep subsequent to the cooling is effective to provide dynamic strains and, therefore, the fine ferrite-pearlite structure can be obtained.

Curves (3) and (4) represent cooling curves applicable where as a non-standard structure, a tempered martensite structure, which is a thermally refined structure, is to be obtained. When at the end of the hot forging step the component part is partly cooled down to a temperature falling within the range of Ms point and Mf point and is subsequently heat-recuperated and tempered at a predetermined temperature range, the thermally refined structure, that is, the tempered martensite structure can be obtained as the non-standard structure. If the temperature at which heat-recuperating and tempering take place is chosen to be within the range of about 500 to about 600° C., the thermally refined structure will become sorbite. On the other hand, if the temperature at which heat-recuperating and tempering take place is chosen to be within the range of about 350 to about 400° C., the thermally refined structure will become troostite.

Curves (5) and (6) shown in FIG. 5 represent respective cooling curves applicable where as a non-standard structure, an upper bainite and a lower bainite are to be obtained, respectively. When at the end of the hot forging step, as a controlled cooling, cooling is performed somewhat slowly at a rate lower than the cooling speed (the cooling speed required to form the martensite) employed during the tempering or quenching, the thermally refined structure will develop to the upper bainite. However, when the tempering is carried out at a cooling speed which is more slowly than this cooling speed, the thermally refined structure will develop to the lower bainite.

It is to be noted that although various cooling methods have been described with particular reference to FIG. 5, any of the cooling methods represented respectively by the curves (1) to (4) out of the cooling methods represented respectively by the curves (1) to (6) shown in FIG. 5 is preferably employed particularly where the non-standard structural part 30 is provided locally such as, for example, at the root portion of the wheel mounting flange 17 shown in connection with the example of FIG. 1.

According to the wheel support bearing device of the foregoing construction, the following effects can be obtained. Since the surface area 30 of the root portion of the wheel mounting flange 17 is rendered to be a non-standard structure and since such non-standard structure is chosen to be one of the fine ferrite-pearlite structure, the upper bainite structure, the lower bainite structure, the tempered martensite structure and the mixed structure comprised of at least two or more of those structures, that root portion of the wheel mounting flange 17 can have an increased strength and a increased life time. Specifically, during, for example, the cornering of the automotive vehicle, a large amplitude deflection occurs repeatedly in the wheel mounting flange 17, accompanied by high stresses repeatedly occurring at that root portion of the flange 17. In consideration of such repeated high stresses, if the surface area 30 of that root portion of the wheel mounting flange 17 is of the non-standard structure referred to above, the non-standard structure can be minute as compared with the matrix portion represented by the standard structure and, also, the hardness will become equal to or higher than that of the matrix portion and, accordingly, the fatigue strength can increase as a result of minuteness of the non-standard structure and increase of the hardness as discussed above. For this reason, as compared with the wheel mounting flange containing the conventional standard structure, the wheel mounting flange can be highly strengthened and withstand stresses of a high amplitude, and as a result, an undesirable occurrence of cracking at that root portion of the wheel mounting flange 17 can be suppressed to increase the life time. In other words, such a sequence of phenomenon as occurrence of a cracking→increase of a displacement of the wheel mounting flange 17→increase of an amplitude of the automotive vehicle→damage to the wheel support bearing device can be suppressed to allow the lift time to be increased.

Because of the foregoing, as compared with the wheel support bearing device containing the conventional standard structure, reduction in both size and weight can be accomplished and, accordingly, the weight of raw materials to be put into product manufacture of the wheel support bearing device can advantageously be reduced to thereby reduce the cost, making it possible to provide the wheel support bearing device at an inexpensive cost.

Since that portion 30 of the non-standard structure can be obtained by effecting the cooling during the hot forging step or at the end of the hot forging step, addition of a simple processing is sufficient and an undesirable reduction in productivity which would otherwise be brought about as a result of increase of the process steps can be suppressed. By way of example, as compared with normalizing and thermal refining, the process can be simplified. Also, since heat evolved in the hot forging is utilized, the amount of energies used in a process of thermal refining of the structure can be reduced. Unlike the induction hardening, even though a corner portion delimited between the wheel mounting flange 17 and the pilot portion 20 is an area having a small radius of curvature, the process of thermal refinement can be achieved without being accompanied by such a problem associated with melt-down resulting from overheating.

Since that portion 30, which is rendered to be the non-standard structure, is a small portion of the wheel mounting flange 17 to be machined, any possible reduction in processability of the flange 17 such as, for example, capability of being machined can be minimized.

FIG. 6 illustrates a second preferred embodiment, in which the wheel support bearing device according to the embodiment shown in and described with particular reference to FIG. 1 is modified to permit it to be used for supporting a vehicle driven wheel. In this embodiment, as hereinbefore described, the hub 14 is rendered to be of a type having no throughhole such as identified by 21 in connection with the first embodiment shown in and described with reference to FIG. 1. Also, the inner ring 15 is axially fixedly mounted on the hub 14 by means of a crimped portion 14b formed by crimping an inboard end of the axle portion 14a of the hub axle 14 in a direction radially outwardly.

In the embodiment shown in and described with reference to FIG. 6, that portion 30 of the non-standard structure is represented by a surface area of the root portion of the wheel mounting flange 17.

Effects brought about by the employment of that portion 30 of the non-standard structure are similar to those afforded by the first embodiment shown in and described with reference to FIG. 1. Also, in the case of the wheel support bearing device of a type having such crimped portion 14b as employed in the example shown in and described with particular reference to FIG. 6, the crimped portion 14b will not be hardened and, therefore, any crimping work will not be disturbed if that portion 30 of the non-standard structure is locally formed by showering the coolant during or at the end of the hot forging step effected to the hub 14 to thereby cool a portion of the hub axle 14.

FIGS. 7 to 13 illustrate third to ninth preferred embodiments of the present invention, respectively. Even in each of those embodiments, the provision is made of the portion 30 of the non-standard structure so that such effects can be obtained that as a result of the minuteness and increased hardness of the structure, the strength and the fatigue strength can be increased to increase the life time.

It is to be noted that each of those third to ninth embodiments is substantially similar to the first embodiment, shown in and described with reference to FIGS. 1 to 5, unless otherwise specifically explained.

Figure 7:
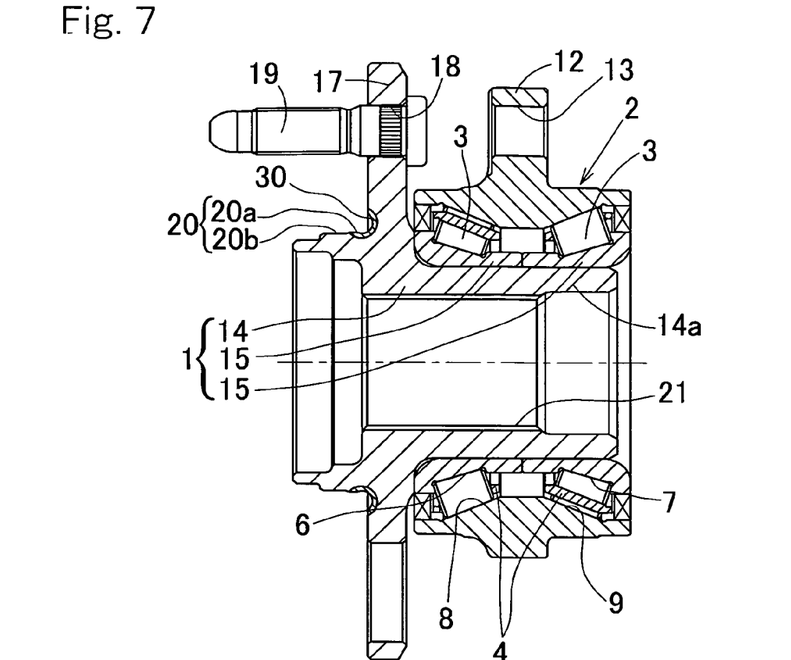
FIG. 7 is a longitudinal sectional view showing an example of the wheel support bearing device manufactured by the producing method according to a third preferred embodiment of the present invention.

The wheel support bearing device according to the third embodiment shown in FIG. 7 is a tapered roller bearing type for the support of a vehicle drive wheel, in which the inner member 1 is made up of a hub 14 and a plurality of, for example, two inner rings 15 mounted on an outer periphery of an axle portion 14a of the hub axle 14. The inner rings 15 are provided one for each row. The outer member 2 is a member of one-piece construction.

This is an example, in which the root portion of the wheel mounting flange 17 in the hub 14 is rendered to be a portion 30 of the non-standard structure.

Figure 8:
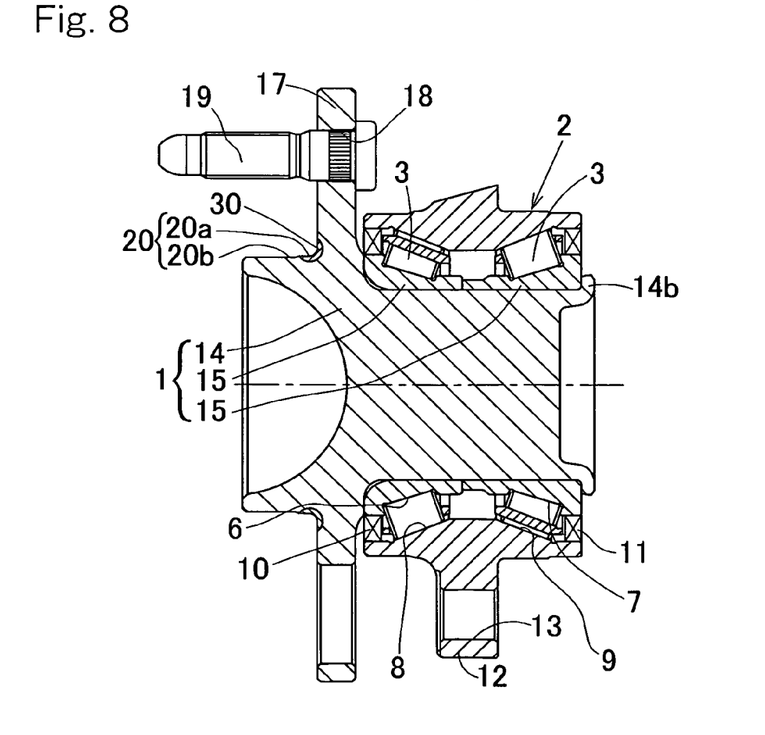
FIG. 8 is a longitudinal sectional view showing an example of the wheel support bearing device manufactured by the producing method according to a fourth preferred embodiment of the present invention.

The fourth embodiment shown in FIG. 8 is of a type, in which the wheel support bearing device according to the third embodiment shown in and described with particular reference to FIG. 7 is modified to permit it to be used for supporting a vehicle driven wheel and in which the hub 14 is designed to have no throughhole 21 in its center portion. Also, the inner ring 15 is fixed to the hub 14 by means of a crimped portion 14b in the hub 14. Other structural features thereof than those described above are substantially similar to those in the embodiment shown in and described with particular reference to FIG. 7.

Figure 9:
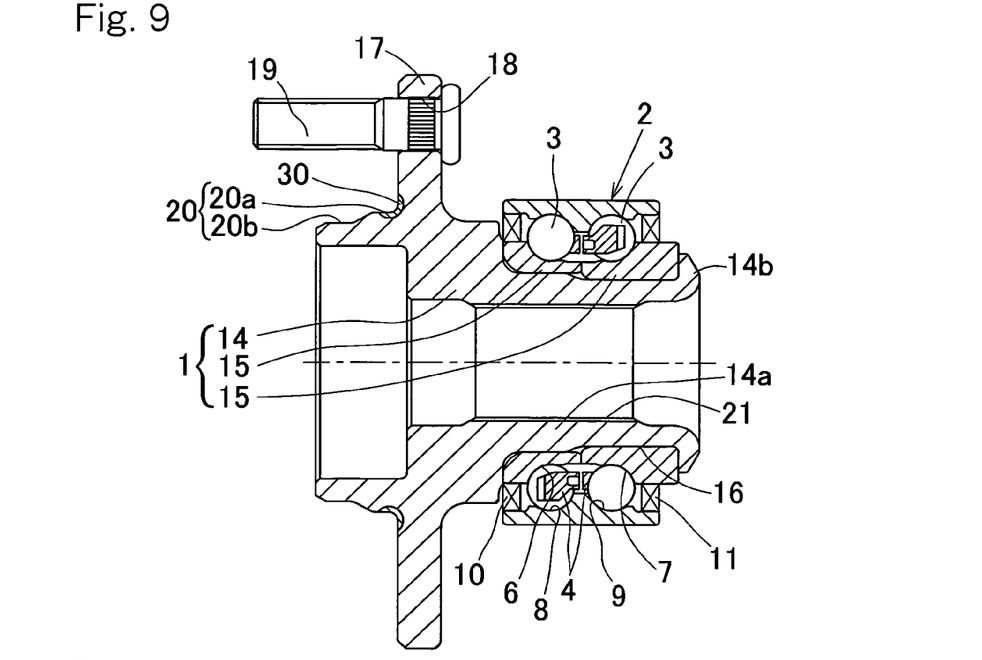
FIG. 9 is a longitudinal sectional view showing an example of the wheel support bearing device manufactured by the producing method according to a fifth preferred embodiment of the present invention.

The wheel support bearing device according to the fifth embodiment shown in FIG. 9 is of an angular contact ball bearing type for use in supporting a vehicle drive wheel, in which the inner member 1 is made up of a hub 14 and double rows of inner rings 15, 15 mounted on an outer periphery of an axle portion 14a of the hub axle 14. The inner rings 15 are provided one for each row and the inboard inner ring 15 may have a thickness and an axial dimension, which are greater than those of the outboard inner ring 15. Also, the inner rings 15 and 15 are axially fixed to the hub 14 by means of a crimped portion 14b provided in the hub 14. The outer member 2 is in the form of a member of one-piece construction having an outer diametric surface rendered to be a cylindrical surface over the entirety and no vehicle body fitting flange such as employed in the example of FIG. 1 and shown by 12 is employed.

This is an example, in which the root portion of the wheel mounting flange 17 in the hub 14 is rendered to be a portion 30 of the non-standard structure.

Figure 10:
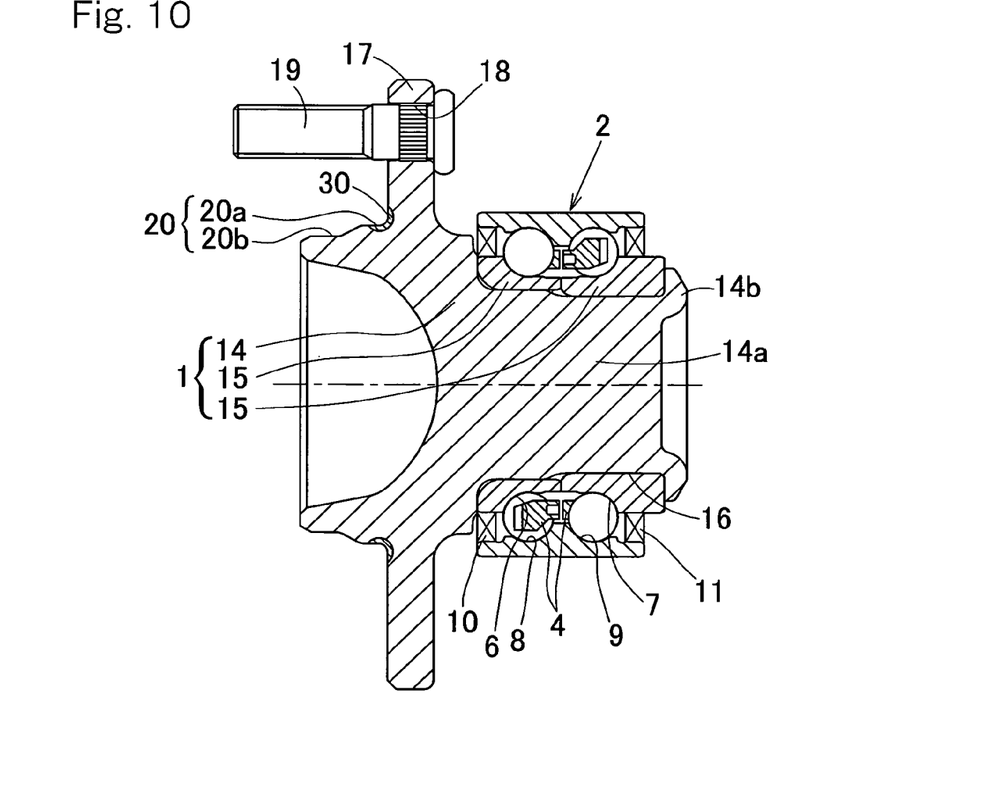
FIG. 10 is a longitudinal sectional view showing an example of the wheel support bearing device manufactured by the producing method according to a sixth preferred embodiment of the present invention.

The sixth embodiment shown in FIG. 10 is of a type, in which the wheel support bearing device according to the fifth embodiment shown in and described with particular reference to FIG. 9 is modified to permit it to be used for supporting a vehicle driven wheel and in which the hub 14 is designed to have no throughhole 21 in its center portion. Other structural features thereof than those described above are substantially similar to those in the embodiment shown in and described with particular reference to FIG. 9.

Figure 11:
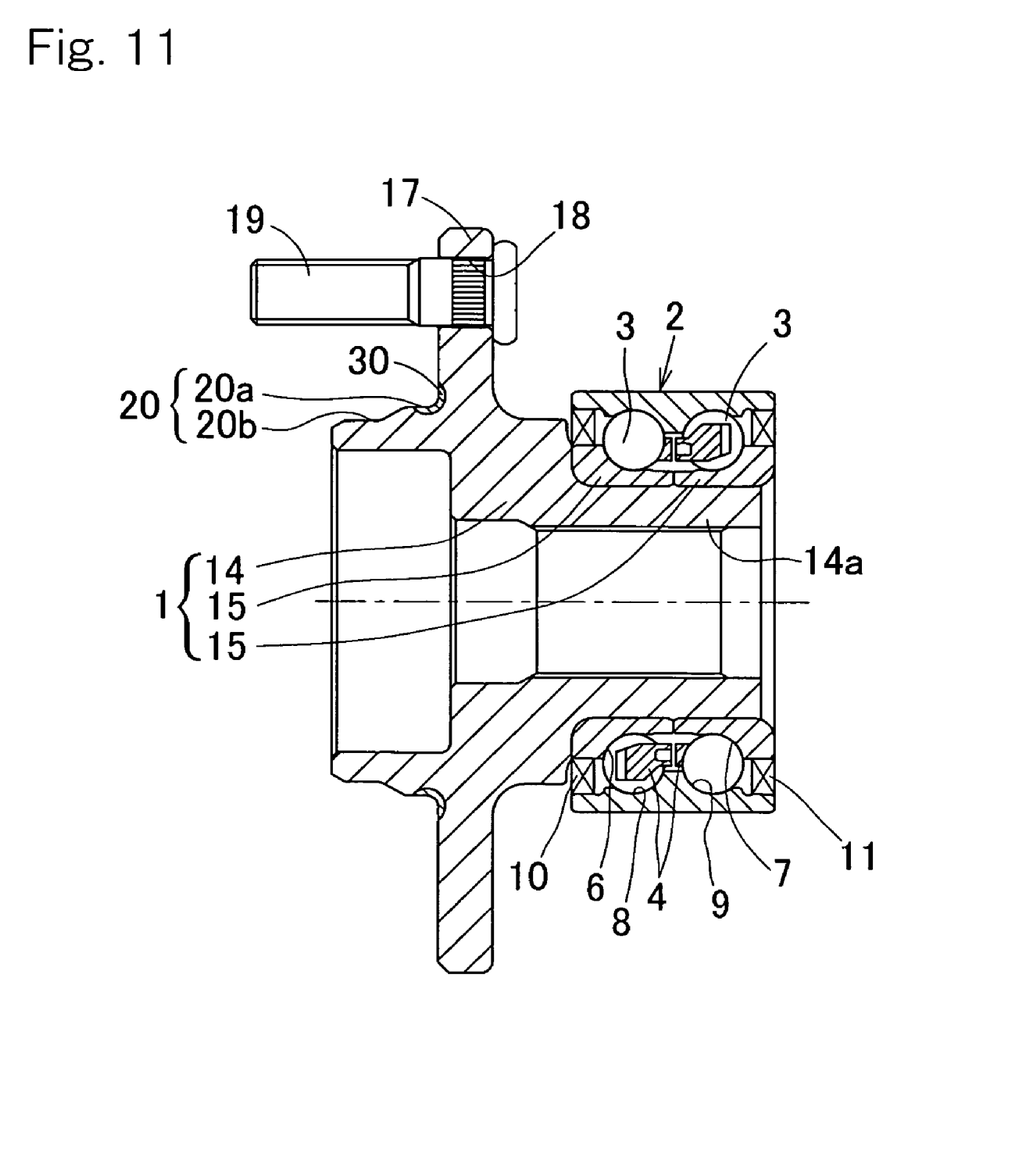
FIG. 11 is a longitudinal sectional view showing an example of the wheel support bearing device manufactured by the producing method according to a seventh preferred embodiment of the present invention.

The wheel support bearing device according to the seventh embodiment shown in FIG. 11 is similar to the wheel support bearing device according to the embodiment shown in and described with particular reference to FIG. 9, in which the inner member 1 is made up of the hub 14 and the double rows of the inner rings 15 mounted on the outer periphery of the axle portion 14a of the hub axle 14. The outer member 2 is a member of one-piece construction, having no vehicle body fitting flange such as identified by 12 in the previously described embodiments. In the illustrated instance, the two inner rings 15 are of the same size and fixing of the inner rings 15 axially relative to the hub 14 is accomplished not by the use of a crimping technique, but by means of a constant velocity universal joint (not shown) coupled with the hub 14. A portion 30 to be rendered as the non-standard structure is the same as that in the example shown in and described with particular reference to FIG. 9.

Figure 12:
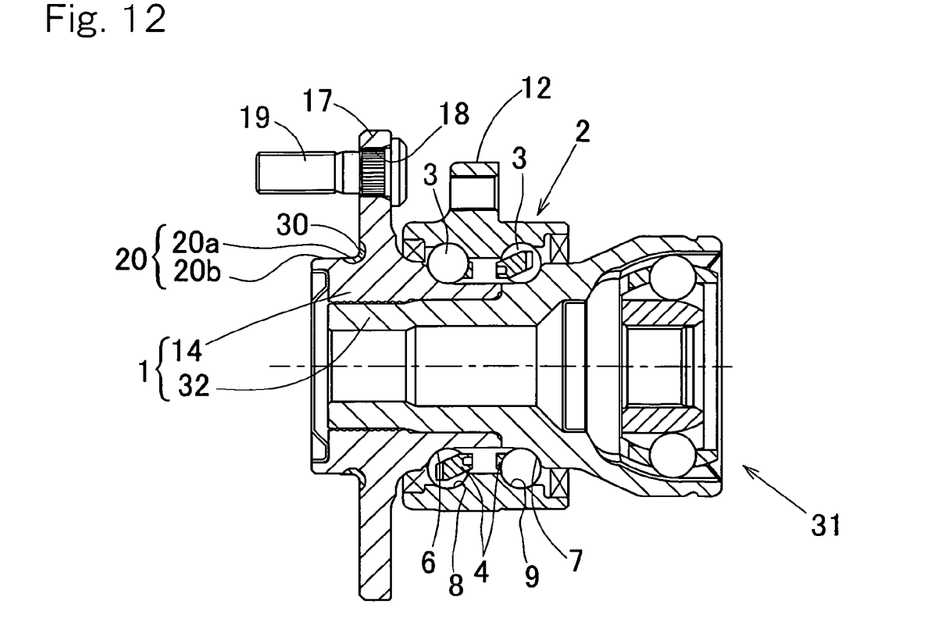
FIG. 12 is a longitudinal sectional view showing an example of the wheel support bearing device manufactured by the producing method according to an eighth preferred embodiment of the present invention.

The wheel support bearing device according to the eighth embodiment shown in FIG. 12 is of a fourth generation type, in which the inner member 1 is made up of a hub 14 and a joint outer ring 32, which is one of coupling members forming respective parts of a constant velocity universal joint 31. Rows of raceway surfaces 6 and 7 are formed respectively on the hub 14 and the joint outer ring 32. The outer member 2 is of one-piece construction, having a vehicle body fitting flange 12. This figure illustrates an example, in which the root portion of the wheel mounting flange 17 integral with the hub 14 is rendered to be a portion 30 of the non-standard structure.

Figure 13:
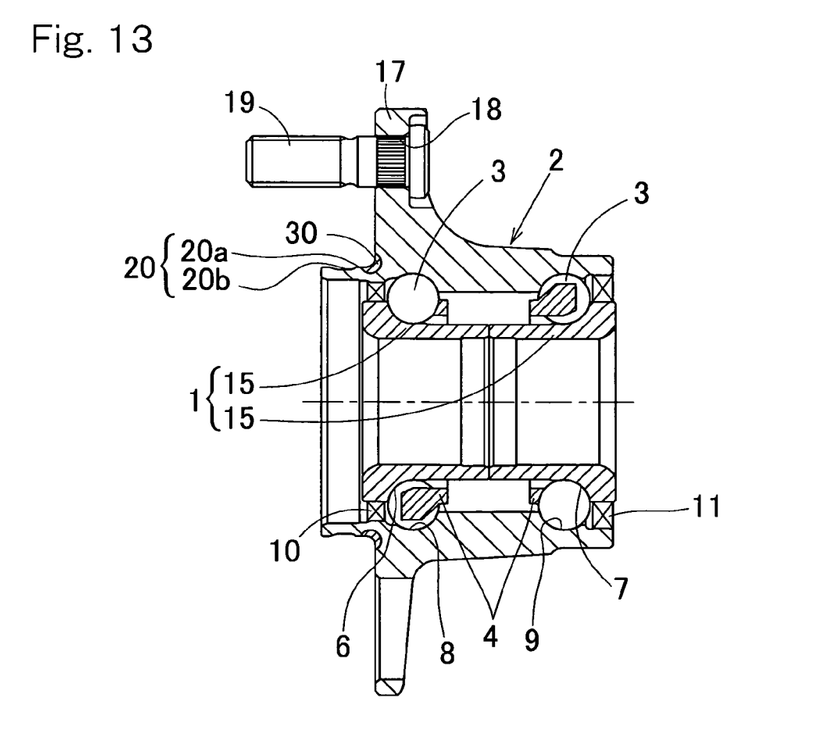
FIG. 13 is a longitudinal sectional view showing an example of the wheel support bearing device manufactured by the producing method according to a ninth preferred embodiment of the present invention.

The wheel support bearing device according to the ninth embodiment shown in FIG. 13 is an outward ring rotating model of a second generation type, in which the inner member 1 is in the form of double rows of inner rings 15. The outer member 2 includes a wheel mounting flange 17 and a pilot portion 20. This figure illustrates an example, in which the root portion of the wheel mounting flange 17 is rendered to be a portion 30 of the non-standard structure.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A method of producing a bearing device for a wheel, the bearing device including an inner member and an outer member rotatable relative to each other through a plurality of rolling elements, one of the inner member and the outer member being a component part, the method comprising:

forming the component part by hot forging, wherein during or at the end of the hot forging of the component part, a portion of the component part is cooled by showering a coolant over the component part or by controlling a cooling speed and temperature, whereby a matrix of the component part represents a standard structure and a surface portion of the component part represents a non-standard structure, and wherein the non-standard structure is a mixed structure comprising at least two or more of the following structures a fine ferrite-pearlite structure which is obtained by showering a coolant over the component part to locally cool it and subsequently self-recuperating it;

a fine ferrite-pearlite structure which is obtained by showering a coolant over the component part to locally cool it preceding the hot forging;

a tempered martensite structure, which is obtained by at the end of the hot forging by partially cooling the component part down to a martensite start point or lower, followed by heat-recuperating and tempering;

an upper bainite structure, which is obtained by cooling the component part down to a temperature about equal to the room temperature at a predetermined cooling speed at the end of the hot forging; and a lower bainite structure, which is obtained by cooling the component part down to a temperature about equal to the room temperature at a predetermined cooling speed at the end of the hot forging.

2. The bearing device producing method as claimed in claim 1, wherein the component part, where the non-standard structure is to be formed, is a component part having a wheel mounting flange and in which a portion where the non-standard structure is to be formed is a surface area of a root portion of the wheel mounting flange.

3. The bearing device producing method as claimed in claim 1, wherein the inner member comprises:

a hub; and an inner ring mounted on an outer periphery of an axle portion of the hub, wherein the component part where the non-standard structure is to be formed is the hub.

* * * * *